No. 671,252. Patented Apr. 2, 1901.
A. WEATHERBY.
CHUCK.
(Application filed Nov. 15, 1900.)
(No Model.)

Witnesses:
V. R. Holcomb
E. V. Brown

Inventor:
Aaron Weatherby, by
Harry P. Williams
atty.

THE NORRIS PETERS CO., PHOTO-LITHO., WASHINGTON, D. C.

UNITED STATES PATENT OFFICE.

AARON WEATHERBY, OF HARTFORD, CONNECTICUT.

CHUCK.

SPECIFICATION forming part of Letters Patent No. 671,252, dated April 2, 1901.

Application filed November 15, 1900. Serial No. 36,583. (No model.)

*To all whom it may concern:*

Be it known that I, AARON WEATHERBY, a citizen of the United States, residing at Hartford, in the county of Hartford and State of Connecticut, have invented certain new and useful Improvements in Chucks, of which the following is a specification.

This invention relates to those chucks which have independently-adjustable reversible jaws for holding metal which is to be operated upon by a cutter.

The object of the invention is to provide a chuck of this nature having means for adjusting the jaws which are simple to manufacture, easy to assemble, and convenient to manipulate.

The embodiment of the invention that is illustrated by the accompaning drawings has a cylindrical body with a central opening and radial slots, in which slots are the reversible jaws, that are moved toward and from the center of the body by means of adjusting-screws held in sockets below the inner edges of the jaws by bushings which are screwed into the outer ends of the screw-sockets and held by locking-screws.

Figure 1:
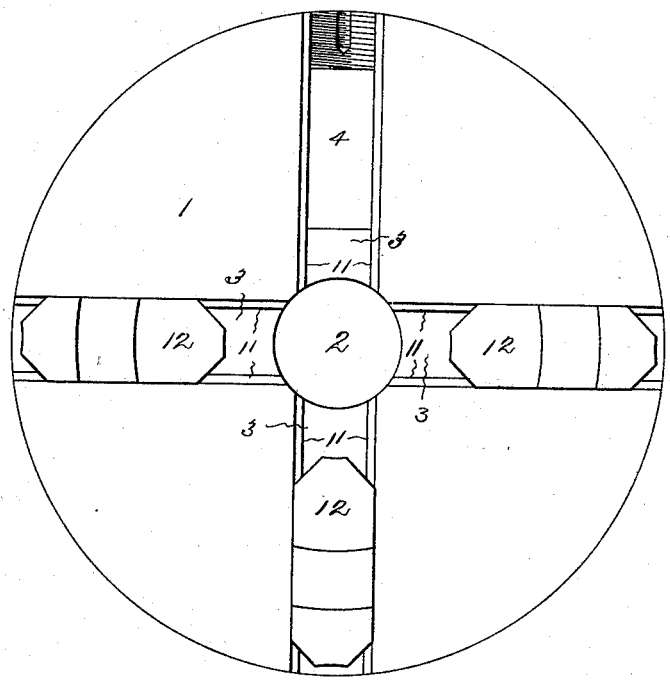
Figure 2:
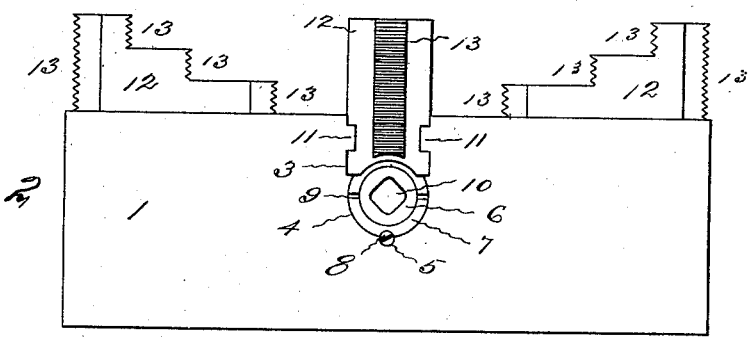
Figure 3:
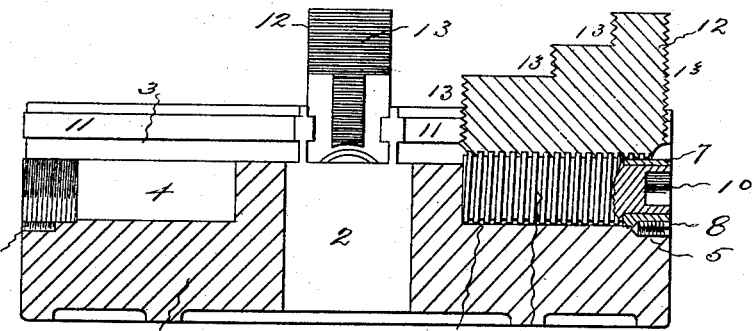

Figure 1 of the drawings shows a face view of this chuck with one of the jaws omitted. Fig. 2 shows an edge view of the chuck, and Fig. 3 shows a diametrical section of the chuck with the jaw on one side omitted.

The cylindrical body 1 of the chuck has a perforation 2 through the center and four radial slots 3 in one face. Below each radial slot is an adjusting-screw socket 4, the outer end of which is threaded, and at the outer end of the adjusting-screw socket is a threaded locking-screw socket 5.

An adjusting-screw 6 is located in each adjusting-screw socket, so that a portion of its periphery will extend into the adjacent radial slot. The inner end of each adjusting-screw butts against the inner end of its socket, while the outer end of each adjusting-screw is reduced in diameter and provided with a bushing 7, that has a threaded exterior that fits the thread cut in the walls of the outer end of the adjusting-screw socket. The upper part of each bushing is cut away a little to allow a jaw when screwed in or out to pass over it. The adjusting-screws are placed in the sockets. Then the bushings are placed on the reduced ends of the screws and turned into the threaded portions, so as to retain the screws in position. After the bushings have been turned to position a lock-screw 8 is turned into each locking-screw socket, a portion of which is formed in the wall of the body at the end of the adjusting-screw socket and a portion in the edge of the bushing. The outer end of each bushing is provided with slots 9 for a spanner, and the end of each adjusting-screw has a recess 10 for the insertion of the key by means of which the adjusting-screw may be turned. The side walls of the radial slots are cut so as to leave inwardly-projecting tongues 11. Movable in each radial slot and having grooves which fit the tongues on the side walls is a jaw 12. The outer edge of each jaw is formed with a number of shoulders in order to provide gripping-faces 13 for holding work of different diameters. These gripping-faces are roughened in a common manner, so they will tightly bite the metal which they are to hold. The inner edge of each jaw has a segment of a female thread cut into it, and when the jaw is in its radial slot the segment of the thread meshes with the thread of the adjusting-screw located below the jaw, so that when the adjusting-screw is turned the jaw is moved.

The body of this chuck is simple to manufacture, the jaws are of common form, and the screws for independently adjusting the reversible jaws are readily produced. It is easy to place the adjusting-screws in their sockets and to retain them in position by the bushings and hold the bushings by the locking-screws. The jaws can be conveniently manipulated by turning each screw with a wrench or crank, so that they may be made to tightly grasp metal of different diameters.

I claim as my invention—

1. A reversible jaw-chuck consisting of a body having radial slots with tongues projecting from the walls of the slots and adjusting-screw sockets with threaded outer ends, below and opening into the slots, adjusting-screws located in the adjusting-screw sockets, bushings on the outer ends of adjusting-screws and having exterior threads that fit the threads at the outer ends of the adjusting-screw sockets, the upper portions of the bushings being cut away to permit the passing of the jaws over the bushings, and reversible jaws movable in the slots with grooves in their side walls fitting the tongues projecting from the walls of the slots, each jaw having a segment of a screw-thread on its inner edge in engagement with the thread of the adjusting-screw in the adjacent adjusting-screw socket, substantially as specified.

2. A reversible jaw-chuck consisting of a body having radial slots with tongues projecting from the walls of the slots and adjusting-screw sockets with threaded outer ends, below and opening into the slots, locking-screw sockets opening into the outer ends of the adjusting-screw sockets, adjusting-screws located in the adjusting-screw sockets, bushings on the outer ends of the adjusting-screws and having exterior threads that fit the threads at the outer ends of the adjusting-screw sockets, the upper portions of the bushings being cut away to permit the passing of the jaws over the bushings, locking-screws turning in the locking-screw sockets and bushings to prevent the bushings from rotating, and reversible jaws movable in the slots with grooves in their side walls fitting the tongues projecting from the walls of the slots, each jaw having a segment of a screw-thread on its inner edge in engagement with the thread of the adjusting-screw in the adjacent adjusting-screw socket, substantially as specified.

AARON WEATHERBY.

Witnesses:
H. R. WILLIAMS,
V. R. HOLCOMB.